United States Patent [19]
Gibson

[11] Patent Number: 5,853,455
[45] Date of Patent: Dec. 29, 1998

[54] VAPOR RECOVERY SYSTEM WITH CONTINUOUS INLET MONITORING

[75] Inventor: David L. Gibson, Louisville, Ky.

[73] Assignee: Jordan Technologies, Inc., Fisherville, Ky.

[21] Appl. No.: 843,306

[22] Filed: Apr. 14, 1997

[51] Int. Cl.⁶ .................................................. B01D 53/04
[52] U.S. Cl. ........................... 95/11; 55/DIG. 34; 95/25; 95/96; 95/148; 96/11; 96/130; 96/417
[58] Field of Search .................... 95/11, 13, 25, 95/23, 8, 96, 143, 146, 148; 96/111, 110, 109, 130, 143, 144; 55/274, DIG. 34

[56] References Cited

U.S. PATENT DOCUMENTS

| | | | |
|---|---|---|---|
| 3,775,946 | 12/1973 | Brazzel | 96/130 |
| 3,867,111 | 2/1975 | Knowles | 95/146 |
| 3,902,874 | 9/1975 | McAndrew | 95/146 |
| 3,918,932 | 11/1975 | Lee et al. | 95/25 |
| 3,926,230 | 12/1975 | Stary et al. | 95/146 |
| 4,025,324 | 5/1977 | Stackhouse, Jr. et al. | 96/111 |
| 4,392,870 | 7/1983 | Chieffo et al. | 95/25 |
| 4,462,811 | 7/1984 | Dinsmore et al. | 96/130 |
| 4,504,286 | 3/1985 | Carlisle et al. | 96/111 |
| 4,630,038 | 12/1986 | Jordan | 340/632 |
| 4,816,043 | 3/1989 | Harrison | 96/130 |
| 4,927,434 | 5/1990 | Cordes et al. | 96/130 |
| 4,995,890 | 2/1991 | Croudace | 96/111 |
| 5,154,735 | 10/1992 | Dinsmore et al. | 96/130 |
| 5,258,056 | 11/1993 | Shirley et al. | 96/130 |
| 5,294,246 | 3/1994 | Gardner, Sr. | 95/23 |
| 5,345,771 | 9/1994 | Dinsmore | 96/130 |
| 5,681,369 | 10/1997 | Osborne | 96/130 |

Primary Examiner—Duane S. Smith
Attorney, Agent, or Firm—King and Schickli

[57] ABSTRACT

A method is provided for efficiently controlling the operation of a vapor recovery system including a first reaction vessel and first bed of adsorbent, a second reaction vessel and second bed of adsorbent and a vacuum pump for selectively regenerating those beds of adsorbent. The method includes the step of adsorbing vapor from an air-volatile liquid vapor mixture on the first bed of adsorbent in the first reaction vessel, measuring a total amount of the vapor adsorbed by the first bed of adsorbent, comparing the total amount of vapor adsorbed on the first bed of adsorbent to a first predetermined value which is a percentage of the first bed adsorbance capacity and regenerating the first bed of adsorbent and adsorbing the vapor from the air-volatile liquid vapor mixture on the second bed of adsorbent in the second reaction vessel upon reaching the first predetermined value. The method also includes the steps of measuring a total amount of the vapor adsorbed by the second bed of adsorbent, comparing the total amount of vapor adsorbed on the second bed of adsorbent to a second predetermined value that is a percentage of the second bed's adsorbance capacity and regenerating the second bed of adsorbent and adsorbing the vapor from the air-volatile liquid vapor mixture on the first bed in the first reaction vessel upon reaching the second predetermined value. A volatile liquid vapor recovery system incorporating the new control system is also provided.

12 Claims, 2 Drawing Sheets

VAPOR RECOVERY SYSTEM WITH CONTINUOUS INLET MONITORING

TECHNICAL FIELD

The present invention relates generally to the field of volatile liquid vapor recovery and, more particularly, to an apparatus and a method for improving the efficiency of a vapor recovery system by means of continuous inlet monitoring.

BACKGROUND OF THE INVENTION

When handling volatile liquids such as hydrocarbons including gasoline and kerosene, air-volatile liquid vapor mixtures are readily produced. The venting of such air-vapor mixtures directly into the atmosphere results in significant pollution of the environment and a fire or explosion hazard. Accordingly, existing environmental regulations require the control of such emissions.

As a consequence, a number of processes and apparatus have been developed and utilized to recover volatile liquids from air-volatile liquid vapor mixtures. Generally, the recovered volatile liquids are liquified and recombined with the volatile liquid from which they were vaporized thereby making the recovery process more economical.

The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these shortcomings, alternative technology was sought and adsorption/absorption vapor recovery systems were more recently developed. Such systems are disclosed in a number of U.S. Patents including, for example, U.S. Pat. No. 5,426,945 to Menzenski; U.S. Pat. No. 5,515,686 to Jordan; U.S. Pat. No. 5,584,911 to Menzenski and U.S. Pat. No. 5,591,254 to Gibson, the disclosure of which are all fully incorporated herein by reference. Such systems utilize a bed of solid adsorbent selected, for example, from silica gel, certain forms of porous mineral such as alumina and magnesia, and most preferably activated charcoal. These adsorbents have an affinity for volatile hydrocarbon liquids. Thus, as the air-hydrocarbon vapor mixture is passed through the bed, a major portion of the hydrocarbons contained in the mixture are adsorbed on the bed. The resulting residue gas stream comprising substantially hydrocarbon-free air is well within regulated allowable emission levels and is exhausted into the environment.

It should be appreciated that the bed of adsorbent used in these systems is only capable of adsorbing a certain amount of hydrocarbons before reaching capacity and becoming ineffective. Accordingly, the bed must be periodically regenerated to restore the carbon to a level where it will effectively adsorb hydrocarbons again. This regeneration of the adsorbent is a two step process.

The first step requires a reduction in the total pressure by pulling a vacuum on the bed that removes the largest amount of hydrocarbons. The second step is the addition of a purge air stream that passes through the bed. The purge air polishes the bed so as to remove substantially all of the previously adsorbed hydrocarbons. These hydrocarbons are then pumped to an absorber tower wherein an absorber fluid such as lean oil or other nonvolatile liquid solvent is provided in a countercurrent flow relative to the hydrocarbon rich air-hydrocarbon mixture being pumped from the bed. The absorber fluid condenses and removes the vast majority of the hydrocarbons from that mixture and the residue gas stream from the absorber tower is recycled to a second bed of adsorbent while the first bed completes regeneration.

In accordance with state of the art operation, when each operational cycle is initiated hydrocarbon vapors from the air-volatile liquid vapor mixture recovered during loading are passed through the selected bed of adsorbent and clean air is exhausted into the environment. Operation continues in this manner until a predetermined number of trucks are loaded with the volatile hydrocarbon liquids. The predetermined number is selected based upon a number of factors including the volatility of the liquid, the size of the trucks, the size of the bed of adsorbent and current weather conditions. Once the predetermined number of trucks are loaded, the regeneration cycle is initiated for the first time. The vapor recovery system then continues to cycle approximately every 15 minutes first regenerating one bed of adsorbent and then the other. The alternating cycles just described continue for the remainder of the time the trunk loading terminal is in operation: perhaps a twelve to sixteen hour period or shift. More specifically, the cycling continues until no truck loading activity occurs over a set period of time such as one hour.

Such a truck counting system is necessarily an estimation of hydrocarbon load being placed upon a bed and therefore subject to inaccuracy. In order to substantially eliminate the possibility of exceeding bed capacity and emissions limits, a significant margin of error must be provided. Consequently, the bed of adsorbent is not being utilized anywhere near its actual capacity. This represents one form of operating inefficiency manifest in the state of the art truck counting approach. Another is the fact that regardless of need, the beds are recycled continuously approximately every 15 minutes. During low volume, low traffic periods, this unnecessary cycling through bed regeneration significantly raises operating costs. Specifically, not only is significant energy utilized to operate the vacuum pump(s) used to regenerate the beds but in many cases, the equipment is subjected to unnecessary wear that increases maintenance requirements without beneficial results or other justification. Accordingly, a need is identified for an improved method and apparatus for efficiently controlling the operation of a vapor recovery system.

SUMMARY OF THE INVENTION

Accordingly, it is a primary object of the present invention to provide an improved method for efficiently controlling operation of a vapor recovery system and an improved vapor recovery system overcoming the above-described limitations and disadvantages of the prior art.

Another object of the present invention is to provide a control method for a vapor recovery system utilized in the recovery of volatile liquids such as hydrocarbons from an air-volatile liquid vapor mixture wherein significant increases in overall efficiency are provided. This is accomplished by accurately measuring the total load or amount of vapor actually adsorbed on a bed of adsorbent and not regenerating that bed until such time as a predetermined amount of adsorbed vapor is reached. This advantageously avoids unnecessary system cycling and therefore, unnecessary wear on the equipment including the vacuum pump(s) that are used to regenerate the bed. Advantageously, this is also accomplished using a relatively simple and inexpensive arrangement that provides dependable and reliable operation over an extended service life. Further, the control system may even be readily retrofitted to vapor recovery systems in the field.

Still another object of the present invention is to provide a vapor recovery system equipped with a series of special monitors that allow the accurate determination of the vapor load being placed upon a bed so that bed regeneration is only initiated as needed and not as a result of a system estimation, a truck counting parameter or other arbitrary criteria that might be utilized for the same purposes.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method is provided for more efficiently controlling operation of a vapor recovery system including a first reaction vessel and a first bed of adsorbent, a second reaction vessel and a second bed of adsorbent and a vacuum pump for selectively regenerating either of those beds of adsorbent as required. The method may be broadly described as including the steps of adsorbing vapor from an air-volatile liquid vapor mixture on a first bed of adsorbent in the first reaction vessel, measuring a total amount of vapor adsorbed by the first bed of adsorbent, comparing the total amount of vapor adsorbed on the first bed of adsorbent with a first predetermined value that is a percentage of the first bed's adsorbance capacity and regenerating the first bed of adsorbent and adsorbing the vapor from the air-volatile liquid vapor mixture on the second bed of adsorbent in the second reaction vessel upon reaching the first predetermined value.

Still further, the method includes the measuring of a total amount of vapor adsorbed by the second bed of adsorbent, the comparing of that total amount of vapor adsorbed by the second bed of adsorbent to a second predetermined value that is a percentage of the second bed's adsorbance capacity and regenerating the second bed of adsorbent and adsorbing the vapor from the air-volatile liquid vapor mixture on the first bed of adsorbent in the first reaction vessel upon reaching the second predetermined value. Accordingly, from the above method steps, it should be appreciated that the regeneration cycle for each of the first and second beds is only initiated when those beds are approaching their adsorbance capacity. As a consequence, any unnecessary or superfluous cycling of the beds through regeneration cycles is eliminated. All unnecessary wear on any vacuum pump and its seals utilized in regeneration is also eliminated. Accordingly, overall maintenance downtime on all moving parts is reduced and maintenance intervals are increased. Additionally, significant energy savings result since the energy consuming vacuum pump is driven less frequently. This is because regeneration of a bed in only performed when that bed has adsorbed its predetermined value of volatile liquid vapor.

More specifically describing the invention the step of measuring a total amount of vapor adsorbed by the first bed of adsorbent includes the monitoring of the vapor concentration and the total volume of flow of the air-volatile liquid vapor mixture being delivered to the first bed of adsorbent in the first reaction vessel. Additionally, the method includes the monitoring of the vapor concentration of the air-volatile liquid vapor mixture being exhausted from the first reaction vessel after removal of the vast majority of the hydrocarbon vapor. Similarly, the step of measuring the total amount of vapor adsorbed by the second bed of adsorbent includes the monitoring of the vapor concentration and total volume of flow of the air-volatile liquid vapor mixture being delivered to the second bed of adsorbent in the second reaction vessel. Further, the vapor concentration of the air-volatile liquid vapor mixture being exhausted from the second reaction vessel is also monitored. These monitoring steps allow for the accurate and reliable determination of the total amount of hydrocarbon vapor adsorbed by the beds and the mass recovery rate. Since the maximum adsorbance capacity of the beds is known based upon the type of hydrocarbon being adsorbed, the type of adsorbent and the amount of the adsorbent in each bed, the total adsorbance capacity of each bed is known. When the actual measured total amount of hydrocarbon vapor adsorbed on a bed reaches a predetermined value of between 70–100% and more preferably, approximately 80% of the bed's theoretical adsorbance capacity, regeneration of that bed is initiated.

In accordance with a further aspect of the present invention, a vapor recovery system incorporates an improvement which allows the total amount of vapor adsorbed by or loaded onto a bed to be accurately determined. The vapor recovery system includes a first reaction vessel and a first bed of adsorbent, a second reaction vessel and a second bed of adsorbent and a vacuum pump for selectively regenerating either of the first or second beds of adsorbent as required. The improvement comprises a means for measuring a total amount of vapor adsorbed on either the first or second beds of adsorbent from the air-volatile liquid mixture being treated, a means for comparing the total amount of vapor adsorbed on that bed to a predetermined percentage of that bed's adsorbance capacity and a means for initiating regeneration of that bed in response to the total amount of vapor adsorbed on that bed reaching the predetermined value.

Described a different way, the improvement comprises a first monitor for monitoring the concentration of vapor in the air-volatile liquid mixture being delivered to one of the beds of adsorbent. Additionally, the improvement comprises a second monitor for monitoring the total volume of air-volatile liquid vapor mixture being delivered to that bed of adsorbent. Further, the improvement may optionally include a third monitor for monitoring the concentration of the vapor in the air-volatile liquid vapor mixture being exhausted from that bed into the environment following cleaning or scrubbing of the hydrocarbon vapor from the mixture. Additionally, the improvement includes a controller for comparing the total amount of vapor adsorbed on that bed to a predetermined value and initiating regeneration of that bed of adsorbent in response to the total amount of vapor adsorbed on the bed reaching the predetermined value.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
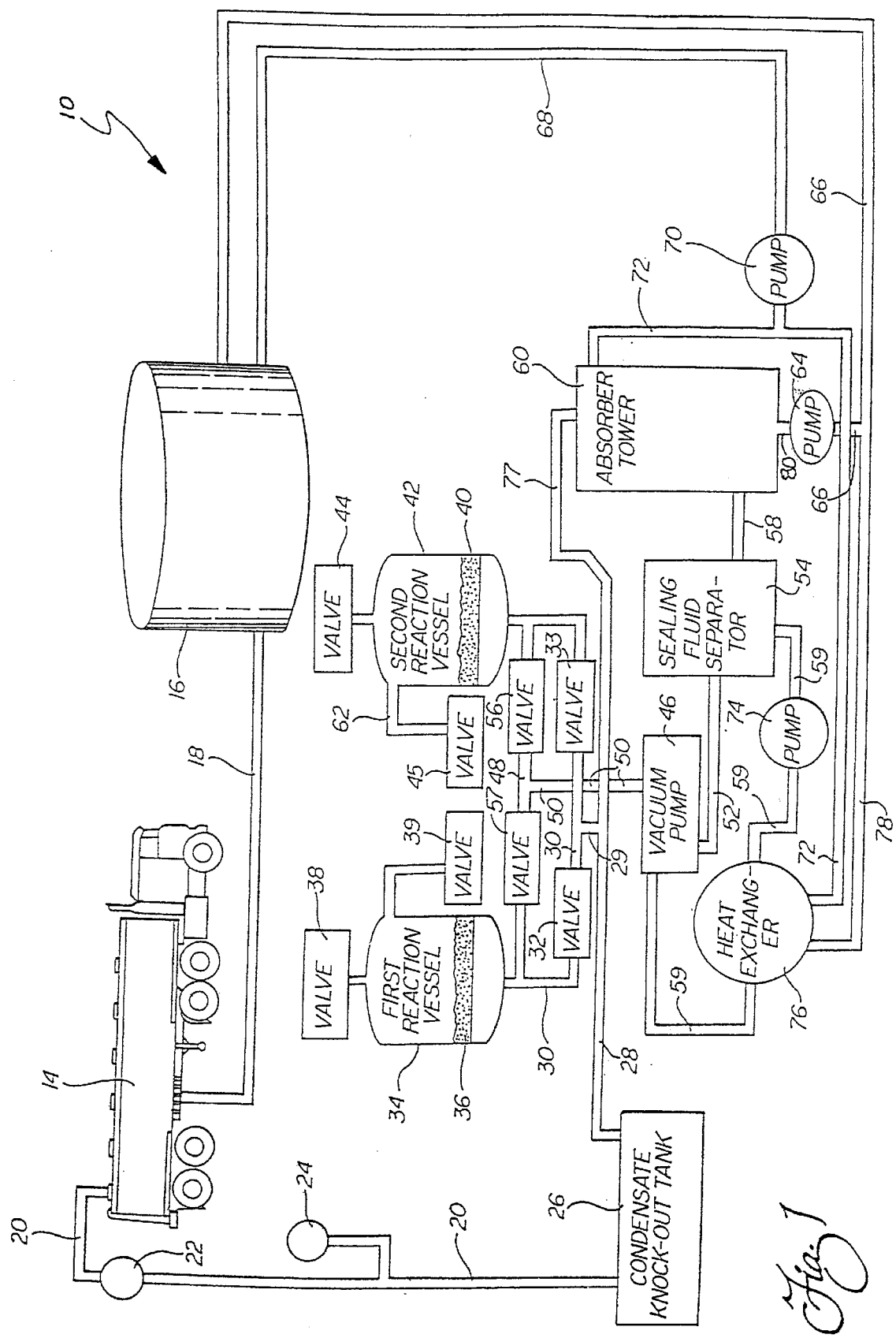
FIG. 1 is a schematical diagram showing a volatile liquid vapor recovery system of the type that may incorporate the improved control system of the present invention.
Figure 2:
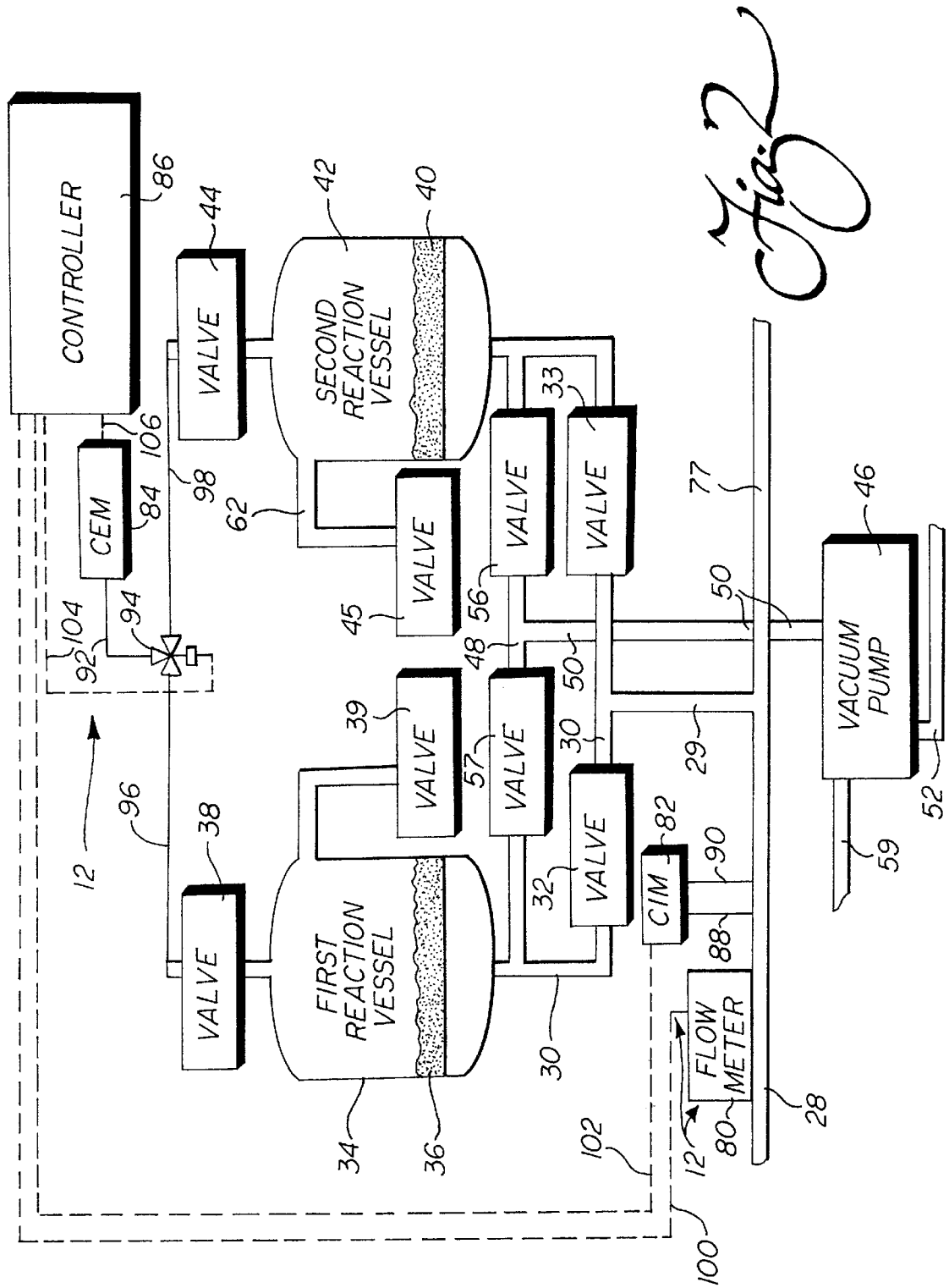
FIG. 2 is a detailed block diagram schematically illustrating the control system improvement embodied by the present invention.

Reference is now made to FIGS. 1 and 2 showing a vapor recovery system 10 incorporating a novel control system, generally designated by reference numeral 12. As will become apparent as the description hereof proceeds, the control system 12 functions to significantly enhance the profitability and productivity of the vapor recovery system 10 by significantly extending maintenance intervals, lowering maintenance costs as well as power consumption and increasing operating efficiency. The vapor recovery system 10 is generally of the type disclosed and described in U.S. Pat. Nos. 5,426,945; 5,515,686; 5,584,911 and 5,591,254 previously referenced.

As shown the vapor recovery system 10 is particularly suited to the recovery of vaporized hydrocarbons of the type expelled from trucks, tank cars and other vessels 14 as they are loaded with hydrocarbons from a storage tank 16 through a feed line 18. More particularly, those vapors are collected as an air-hydrocarbon vapor mixture in a collection line 20, attached to the truck 14 and delivered past a vapor check valve 22 and pressure/vacuum vent 24 to a condensate knock-out tank 26. From there, the air-hydrocarbon vapor mixture passes along the lines 28, 29 and 30 past open valve 32 (valve 33 is closed) to the first reaction vessel 34 including a first bed of absorbent 36. The bed 36 adsorbs the volatile hydrocarbon vapors and an air-volatile liquid vapor mixture of predominately clean air is exhausted past the valve 38 into the environment, valve 39 being closed.

Simultaneously, the adsorbent bed 40 in the second reaction vessel 42 may be regenerated: that is, the capacity of the bed 42 to adsorb vapor may be renewed. To achieve this end, valves 33, 44 and 45 are initially closed and the vacuum pump 46 is operated to pull a vacuum on the bed 40 in the second reaction vessel 42. Generally, as is known in the art, a liquid ring, two-stage vacuum pump having a capacity of 100–2000 cfm is utilized for this purpose. Such a pump may, for example, be obtained from Graham Vacuum Pump of Batavia, N.Y. (e.g. Model 2V7240).

As the pump 46 draws the vacuum down in the reaction vessel 42 to 22–28 inches of mercury vacuum, a mixture of air and volatile liquid vapor is pulled from the bed 40. This mixture is directed by the pump 46 through conduits 48, 50, 52 into the sealing fluid separator 54 by operation of the valve 56 (open) and the valve 57 (closed). The sealing fluid separator 54 separates the pump sealing fluid, required for proper operation of the liquid ring, two-stage vacuum pump 46, from both the condensed volatile liquids that are recovered and the air-vapor mixture that is directed through conduit 58 to the absorber tower 60. The sealing fluid recovered from the separator 54 is recirculated by pump 74 through the lines 59 to the vacuum pump 46 by way of the heat exchanger 76. The sealing fluid is cooled by supplying lean oil from the storage tank 16 through the lines 68, 72 by means of the supply pump 70. In this way the operating temperature of the vacuum pump 46 is controlled to provide better operating efficiency.

Toward the end of the regeneration cycle, (e.g. when a specific vacuum level is reached or for a specific time such as the last one to two minutes of an approximately 10–17 minute cycle), a small quantity of purge air is introduced into the reaction vessel 42 by opening valve 45. This purge air is drawn from the ambient atmosphere through line 62 and is passed through the bed 40 to polish the absorbent clean of the remaining hydrocarbons. During this process it should be appreciated that the purge air is only introduced into the bed 42 at a rate sufficient to substantially maintain a pressure of approximately 22–28 and more preferably 25–27 inches of mercury vacuum. The purge air and the last of the hydrocarbons is also directed by the pump 46 through the separator 54 and conduit 58 to the absorber tower 60.

As is known in the art, the absorber tower 60 provides a countercurrent flow of absorber fluid such as lean oil by means of a dispersal sprayer (not shown) which is fed by a pump 70 with lean oil from the storage tank 16 through lines 68, 72. The absorber fluid serves to condense the volatile liquid vapors from the air-volatile liquid vapor mixture drawn from the reaction vessel 42 by the pump 46 as just described.

The condensed hydrocarbons and absorber fluid are preferably collected from the bottom of the absorber tower 60 by operation of an absorber fluid return pump 64 driven by a motor (not shown) and then delivered via conduit 66 through a one-way flow control valve (not shown) to the storage tank 16. Preferably, the pump 64 is a ANSI pump such as manufactured by Ingersoll-Dresser, capable of pumping between 25–200 gallons per minute. The sizing of the pump 64 and motor depends upon the head pressure in the gasoline storage tank 16 and the desired pump or flow rate. A more detailed description of the absorber fluid return circuit including the pump 64 and motor is found in U.S. patent application Ser. No. 08/668,527, filed Jun. 21, 1996, entitled "Return Circuit for Vapor Recovery System". This patent application has now been abandoned in favor of continuation patent application Ser. No. 08/978,853, copending, filed on Nov. 26, 1997 with the same title. The full disclosure of this document is fully incorporated herein by reference.

The residue air that exits from the absorber tower 60 is largely free of volatile liquid vapor. It, however, is preferably recirculated or recycled for introduction into the first reaction vessel 34 via the conduits 77, 29 and 30. In this way, any residual volatile liquid vapor may be captured in the bed 36 to complete the cleaning of the air-volatile liquid vapor mixture prior to exhausting into the environment past valve 38.

Of course, as is well known in the art it should be appreciated that the reaction vessels 34 and 42 are essentially identical and that the operation thereof may be reversed as required to provide for continuous processing. This means that when the bed 36 is saturated, the bed 36 may be regenerated in the manner described above with reference to the bed 42 while the bed 42 is simultaneously utilized to capture hydrocarbons in the manner described above with reference to the bed 36. This is accomplished by simply reversing the operation of the valve pairs 32 and 33, 56 and 57, 38 and 44, and 39 and 45, respectively to control the flow through the vapor recovery system 10.

In accordance with an important aspect of the present invention, the novel control system 12 provides the vapor recovery system 10 with significantly enhanced operating efficiency. The control system 12 includes a flow meter 80, a continuous inlet hydrocarbon monitor 82 (CIM), a continuous emissions monitor 84 (CEM) and a controller 86. Preferably, the flow meter 80 is an ultrasonic flow meter such as a Panametrics Model GP 68. The flow meter 80 is provided in the line 28 and continuously monitors the volume of the air-volatile liquid vapor mixture being directed through line 28 to either of the beds 36, 40 in the reaction vessels 34, 42 depending upon the relative position of the valves 32, 33.

The continuous inlet hydrocarbon monitor 82 includes a 0–100% hydrocarbon analyzer such as but not limited to a Summit Model IR-8402 for continuously monitoring the concentration of the hydrocarbon in the air-volatile liquid vapor mixture passing through the line 28. More specifically, the continuous input monitor 82 includes a pump that draws a sample of the air-volatile liquid vapor mixture from the line 28 through the sample line 88. Following the determination of the concentration of the hydrocarbon in that mixture with a Non Dispersive Infrared Gas Analyzer (NRID), the air from the continuous inlet hydrocarbon monitor 82 is returned to the line 28 by means of the exhaust line 90. Together, it should be appreciated that the flow meter 80 and the continuous input monitor 82 allow both the total flow volume of the air-hydrocarbon vapor mixture and the concentration of the hydrocarbon in that mixture to be monitored continuously as the hydrocarbon in that mixture is loaded upon the selected bed 36, 40 as determined by the position of the valves 32, 33.

Simultaneously, the continuous emissions monitor 84 includes a 0–5% hydrocarbon analyzer which is utilized to monitor the amount of hydrocarbon in the air-hydrocarbon vapor mixture being exhausted from the reaction vessel 34, 42 containing the bed 36, 40 presently being utilized to treat the mixture and adsorb hydrocarbons. More specifically, the continuous emissions monitor is preferably a Jordan Technologies, Inc. JS-9 Series Continuous Emissions Monitor such as described in U.S. Pat. No. 4,630,038 to Jordan that monitors the concentration of volatile hydrocarbons being emitted through the exhaust line into the ambient air. Specifically, the continuous emissions monitor 84 includes a pump and sample line 92 connected to a flow control valve 94. When the exhaust mixture from the first reacton vessel 34 is to be monitored, the flow control valve 94 is positioned so as to allow a sample to be drawn by the pump from the exhaust valve 38 through line 96, the valve 94 and the sample line 92 to the continuous emissions monitor 84. In contrast, when the exhaust mixture from the second reaction vessel 42 is to be monitored, the flow control valve 94 is positioned so as to allow a sample to be drawn from the exhaust valve 44 through the sample line 98, the control valve 94 and the sample line 92 to the continuous emissions monitor 84. After determining the concentration of hydrocarbons in the exhaust mixture by means of a Non Dispersive Infrared Gas Analyzer (NRID), the analyzed sample is exhausted into the environment.

The flow meter 80, continuous inlet hydrocarbon monitor 82, continuous emissions monitor 84 and flow control valve 94 are operatively connected via respective control lines 100, 102, 104 and 106 to the controller 86. Preferably, the controller 86 is a dedicated microprocessor although a programmable logic controller such as a GE Series 90–30 may be utilized. If the desire is to maintain a record of hydrocarbon concentrations and flow volumes, the controller 86 may be connected to a strip chart recorder (not shown) such as a Yokogawa Model uR 1000 P/M 436002. This is helpful in analyzing the operation of the unit over extended periods of time in order to identify trends in performance for purposes of maintenance and consideration of terminal growth. Further, the controller 86 may be connected to an alarm (not shown) such as an audio buzzer and/or visible beacon or indicator lamp that may signal when the terminal exceeds the vapor recovery system's instantaneous design capacity, the one quarter hour, one hour, four hours or twenty-four hours design capacity or the maximum inlet design concentration.

The operation of the vapor recovery system 10 incorporating the control system 12 will now be described in detail. Assuming both beds 36, 40 are fully regenerated at the time the first truck 14 is loaded at the terminal and valve 32 is open while 33 is closed, air-volatile liquid vapor mixture is recovered and directed through lines 29, 30 and valve 32 to the first bed 36 in the first reaction vessel 34. When loading of the truck begins, a controller 86 monitors the flow meter 80, the continuous input monitor 82, the continuous emissions monitor 84 and positions the flow control valve 94 to feed a sample through the lines 96, 92 to the continuous emissions monitor. Accordingly, the total volume of the air-volatile liquid mixture passing through the line 28 is continuously monitored and measured by the flow meter 80. Similarly, the concentration of the hydrocarbon vapor in the air-volatile liquid vapor mixture is continuously monitored by the continuous inlet hydrocarbon monitor 82 via the sample line 88. Simultaneously, the concentration of volatile liquid vapor in the exhaust mixture from the first reaction vessel 34 is continuously monitored by the continuous emissions monitor 84.

This information is fed through the control lines 100, 102 and 106, respectively, from the flow meter 80, continuous input monitor 82 and continuous emissions monitor 84 to the controller 86. The controller 86 utilizes the continuously provided data to calculate or determine the actual total amount of hydrocarbon vapor adsorbed by the first bed 36. Specifically, this is possible since the data from the flow meter 80 and the continuous input monitor 82 allow the calculation of the total amount or mass of hydrocarbon vapor being delivered to the first reaction vessel 34 and first bed 36. The continuous emissions monitor 84 allows for the estimated calculation of the total amount or mass of hydrocarbon vapor being released into the environment in the exhaust mixture. This is possible since the concentration of the hydrocarbon vapor in the exhaust mixture is continuously monitored and it is known that the exhaust mixture volume must be balanced with the inlet volume since there is no overall change in pressure in the reacton vessel 34. Since the total amount or mass of hydrocarbon vapor entering and exiting the reaction vessel 34 is calculated in this manner, the load or total mass or amount of hydrocarbon vapor adsorbed by the bed is accurately determined by the control system 12.

The controller 86 then continuously compares this changing value with a predetermined value which is a percentage of the first bed's overall adsorbance capacity. The adsorbance capacity may, of course, be easily determined in advance either experimentally or theoretically based upon knowledge of the type of liquid vapor being adsorbed and the type and amount of adsorbents being utilized in the bed. Once the measured adsorbance reaches the first predetermined value of between 70–1000 and more preferably, 80% of the first bed's adsorbance capacity, the controller 86 produces a signal that causes the vapor recovery unit 10 to begin regeneration of the first bed 36 in the first reaction vessel 34.

Specifically, as described above, valve 32 is closed and valve 33 is opened so that the air-volatile liquid vapor mixture is now directed from the lines 28 and 77 through the lines 29 and 30 past valve 33 to the second reaction vessel 42. Simultaneously, valve 57 is opened and operation of the vacuum pump 46 is initiated. Also simultaneously, controller 86 sends a signal through the control line 104 to reposition the flow control valve 94 so that the continuous emissions monitor 84 now samples from the exhaust valve 44 leading from the second reaction vessel 42 via sample lines 98 and 92.

As a result, the flow meter 80 and the continuous input monitor 82 continue to monitor the flow volume and hydrocarbon concentration of the air-volatile liquid vapor mixture passing through the line 28 but this time on its way to the second bed 40 in the second reaction vessel 42. Simultaneously, the continuous emissions monitor 84 continuously monitors the concentration of the volatile liquid vapor in the mixture being exhausted from the second reaction vessel. This continuously monitored data is passed along the respective control lines 100, 102, 106 to the controller 86 which makes the calculations described above to determine or measure the total amount or mass of vapor adsorbed by the second bed of adsorbent. In state of the art vapor recovery systems, the second bed of adsorbent 40 in the second reaction vessel 42 would be subjected to regeneration immediately following regeneration of the first bed since the systems were operated in a continuously operating timed loop. In contrast, as a result of the operation of the control system 12, the second bed 40 is not subjected to regeneration until such time as the total amount or mass of hydrocarbon vapor adsorbed by the second bed reaches a second predetermined value that is a percentage of the second bed's adsorbance capacity. This value is determined in the manner described above but specifically for the second bed rather than the first bed.

It should be appreciated, therefore, that the present system does not unnecessarily operate the vacuum pump 46 and unnecessarily subject the beds 36, 42 to regeneration. Only when the actual hydrocarbon load placed upon the bed requires regeneration is regeneration performed. As a result, significant time periods may elapse where neither bed 36, 40 is being regenerated, valves 56, 57 are closed and the vacuum pump 46 is not in operation. This advantageously reduces overall energy costs by reducing power consumption by the vacuum pump 46, supply pump 70 and return pump 64. It also increases maintenance interval time by eliminating unnecessary wear on all moving parts comprising the bed regeneration system thereby also extending the system's service life. It should therefore, be easily appreciated how the overall operating efficiency of the vapor recovery system 10 is enhanced when utilizing the control system 12 of the present invention.

The foregoing description of a preferred embodiment of the invention has been presented for purposes of illustration and description. It is not intended to be exhaustive or to limit the invention to the precise form disclosed. As described, the invention may include only two monitors, the continuous inlet hydrocarbon monitor 82 and the flow meter 80 but more preferably also includes a third monitor, the continuous emissions monitor 84. When the apparatus includes the continuous emissions monitor 84, it provides more accurate readings and allows a determination of overall system efficiently as well as hydrocarbon mass recovery rate.

Obvious modifications or variations are possible in light of the above teachings. For example, the total amount of volatile liquid vapor adsorbed by a bed may also be accurately determined by monitoring the temperature and pressure of the inlet and outlet vapor streams. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A method for efficiently controlling operation of a vapor recovery system including a first reaction vessel and first bed of adsorbent, a second reaction vessel and second bed of adsorbent and a vacuum pump for selectively regenerating either of said first and second beds of adsorbent, said method comprising:

adsorbing vapor from an air-volatile liquid vapor mixture on said first bed of adsorbent in said first reaction vessel;

measuring a total amount of said vapor adsorbed by said first bed of adsorbent;

comparing said total amount of vapor adsorbed on said first bed of adsorbent to a first predetermined value that is 100% or less of said first bed's adsorbance capacity; and regenerating said first bed of adsorbent and adsorbing said vapor from said air-volatile vapor mixture on said second bed of adsorbent in said second reacton vessel upon reaching said first predetermined value whereby regeneration may be initiated before vapor breakthrough.

2. The method set forth in claim 1, further including:

measuring a total amount of said vapor adsorbed by said second bed of adsorbent;

comparing said total amount of vapor adsorbed on said second bed of adsorbent to a second predetermined value that is a percentage of said second bed's adsorbance capacity; and regenerating said second bed of adsorbent and adsorbing said vapor from said air-volatile liquid vapor mixture on said first bed of adsorbent in said first reaction vessel upon reaching said second predetermined value.

3. The method set forth in claim 2, wherein said measuring a total amount of said vapor adsorbed by said second bed of adsorbent includes monitoring vapor concentration and total volume of flow of said air-volatile liquid vapor mixture being delivered to said second bed of adsorbent in said second reaction vessel and vapor concentration of said air-volatile liquid vapor mixture being exhausted from said second reaction vessel.

4. The method set forth in claim 1, wherein said first predetermined value is between 70–100% of said first bed's theoretical adsorbance capacity.

5. The method set forth in claim 2, wherein said second predetermined value is between 70–100% of said second bed's theoretical adsorbance capacity.

6. The method set forth in claim 2, including interrupting regeneration cycling of said vapor recovery system following regeneration of one of said first and second beds until the other of said first and second beds reaches its predetermined valve.

7. In a vapor recovery system including a first reaction vessel and first bed of adsorbent, a second reaction vessel and second bed of adsorbent and a vacuum pump for selectively regenerating either of said first and second beds of adsorbent, the improvement comprising:
   means for measuring a total amount of vapor adsorbed by one of said first and second beds of adsorbent from an air-volatile liquid vapor mixture; and
   means for (1) comparing said total amount of vapor adsorbed by said one of said first and second beds of adsorbent to a predetermined value, said predetermined value being 100% or less of said one of said first and second bed's adsorbance capacity and (2) initiating regeneration of said one of said first and second beds of adsorbent in response to said total amount of vapor adsorbed by said one of said first and second beds reaching said predetermined value.

8. In a vapor recovery system including a first reaction vessel and first bed of adsorbent, a second reaction vessel and second bed of adsorbent and a vacuum pump for selectively regenerating either of said first and second beds of adsorbent, the improvement comprising:
   a first monitor for monitoring the concentration of said vapor in said air-volatile liquid vapor mixture being delivered to one of said first and second beds of adsorbent;
   a second monitor for monitoring the total volume of flow of said air-volatile vapor mixture being delivered to said one of said first and second beds of adsorbent; and
   a controller for comparing a total amount of vapor adsorbed on said one of said first and second beds of adsorbent to a predetermined value and initiating regeneration of said one of said first and second beds of adsorbent in response to said total amount of vapor adsorbed on said one of said first and second beds reaching said predetermined value.

9. In the vapor recovery system set forth in claim 8, the improvement further including a third monitor for monitoring the concentration of said vapor in said air-volatile liquid vapor mixture being exhausted from said one of said first and second beds of adsorbent.

10. In a vapor recovery system including a first reaction vessel and first bed of adsorbent, a second reaction vessel and second bed of adsorbent and a vacuum pump for selectively regenerating either of said first and second beds of adsorbent, the improvement comprising:
   a monitor for measuring a total amount of vapor adsorbed by one of said first and second beds of adsorbent from an air-volatile liquid vapor mixture;
   a controller for comparing a total amount of vapor adsorbed on said one of said first and second beds of adsorbent to a predetermined value and initiating regeneration of said and one of said first and second beds of adsorbent in response to said total amount of vapor adsorbed on said one of said first and second beds reaching said predetermined value, said predetermined value being 100% or less of said one of said first and second bed's adsorbence capacity.

11. In the vapor recovery system set forth in claim 10, the improvement further including an exhaust monitor for monitoring the concentration of said vapor in said air-volatile liquid vapor mixture being exhausted from said one of said first and second beds of adsorbent.

12. A method for efficiently controlling operation of a vapor recovery system including a first reaction vessel and first bed of adsorbent, a second reaction vessel and second bed of adsorbent and a vacuum pump for selectively regenerating either of said first and second beds of adsorbent, said method comprising:
   adsorbing vapor from an air-volatile liquid vapor mixture on said first bed of adsorbent in said first reaction vessel;
   measuring a total amount of said vapor adsorbed by said first bed of adsorbent by monitoring vapor concentration and total volume of flow of said air-volatile liquid vapor mixture being delivered to said first bed of adsorbent in said first reaction vessel and vapor concentration of said air-volatile liquid vapor mixture being exhausted from said first reaction vessel;
   comparing said total amount of vapor adsorbed on said first bed of adsorbent to a first predetermined value that is a percentage of said first bed's adsorbance capacity; and
   regenerating said first bed of adsorbent and adsorbing said vapor from said air-volatile vapor mixture on said second bed of adsorbent in said second reacton vessel upon reaching said first predetermined value.

* * * * *